United States Patent [19]

Böttger et al.

[11] Patent Number: 4,645,632

[45] Date of Patent: Feb. 24, 1987

[54] BELT-TYPE PARTICLEBOARD PRESS WITH FLEXIBLE UPPER PLATEN

[75] Inventors: Friedrich Böttger, Haan; Klaus Gerhardt, Rheurdt, both of Fed. Rep. of Germany

[73] Assignee: G. Siempelkamp GmbH & Co., Krefeld, Fed. Rep. of Germany

[21] Appl. No.: 719,757

[22] Filed: Apr. 4, 1985

[30] Foreign Application Priority Data

Apr. 10, 1984 [DE] Fed. Rep. of Germany ....... 3413396

[51] Int. Cl.[4] .............................................. B29C 43/22

[52] U.S. Cl. .................................... 264/120; 100/154; 156/583.5; 425/335; 425/371

[58] Field of Search ........................ 100/118, 151, 154; 425/364 R, 335, 371, 329, 406, 149; 264/109, 112, 120, 122, 165, 40.5, 40.7; 156/555, 583.3, 583.5, 583.91

[56] References Cited

U.S. PATENT DOCUMENTS 4,265,608 5/1981 Tunador et al. .................... 425/371

4,311,550 1/1982 Kerttula ............................. 425/371

FOREIGN PATENT DOCUMENTS 2343427 3/1975 Fed. Rep. of Germany .

3133817 3/1983 Fed. Rep. of Germany .

*Primary Examiner*—Tim Miles

*Assistant Examiner*—J. Fortenberry

*Attorney, Agent, or Firm*—Karl F. Ross; Herbert Dubno

[57] ABSTRACT

A belt-type press for making particleboard has a longitudinal row of transverse frames through which pass upper and lower longitudinally extending press beams extending along and carried on the row of frames flanking respective heated press platens in turn flanking stretches of respective upper and lower belts driven to move a mat of particles to be pressed along the path in a transport direction. The upper beam is pressed down by a plurality of substantially identical hydraulic actuators to compress the mat between the belts with a relatively high pressure in an upstream compression region of the press and with a relatively low pressure in a downstream compression region of the press. The upper platen and beam have a downstream calibration portion and an upstream compression portion, the latter being elastically deflectable upward relative. Upper and lower vertically engageable abutments operatively engaged between the upstream portions of the upper platen and beam and the frame limit downward displacement of the upstream portions relative to the frame. In addition at least one abutment operatively engageable between the downstream portions of the upper beam and platen limits downward displacement of same below a predetermined lower position. Thus the thickness of the finished workpiece as it exits the press is established by the abutment of the downstream portions.

7 Claims, 7 Drawing Figures

BELT-TYPE PARTICLEBOARD PRESS WITH FLEXIBLE UPPER PLATEN

FIELD OF THE INVENTION

The present invention relates to a belt-type particleboard press. More particularly this invention concerns such a press which continuously compresses a mat of modest structural coherency into a rigid panel.

BACKGROUND OF THE INVENTION

A belt-type particleboard press has a press frame constituted as a plurality of frames traversed by upper and lower beams carrying respective upper and lower press platens that are normally heated. Endless upper and lower belts have stretches extending along vertically spaced from each other between the platens. These belts are driven synchronously to advance a mat workpiece through the press. A plurality of substantially identical hydraulic actuators are engaged between each frame and the upper beam and platen. The number of actuators per frame increases from the downstream end toward the upstream end. Thus the pressure exerted can be substantially greater at the upstream end than at the downstream end. These actuators are upright simple hydraulic rams and are all pressurized at the same pressure. As described in commonly owned U.S. Pat. No. 4,468,188, the distribution of the rams and of the frames establishes the desired pressing force and press strength in an upstream compression zone and a downstream calibration zone of the press.

Typically the mat is subjected to considerable heat and pressure in the upstream compression zone so as to activate the resin. The pressure is necessary for good heat transmission between the heated platens and the workpiece and to ensure good mixing of the binder with the fibers, chips, or other particles in the mat. The downstream region of the press operates at a lower pressure, so that the effect here is calculated to impart a predetermined finished thickness to the panel being pressed. The resistance that the workpiece offers to compression decreases as it is compressed and heated, in part since the binder plastifies, so that in the calibration zone the main effect achieved is stabilization of the thickness of the compressed panel as the normally thermosetting binder cures.

The problem with these arrangements is that the incoming workpieces vary within a fair range as regards density, thickness, and composition. Hence their resistance to compression and their compressability will vary correspondingly so that the constant force applied in the compression zone will overcompress some parts of some workpieces, thereby damaging fibers, and will not sufficiently compress other parts, thereby leaving voids.

Accordingly German patent document No. 2,343,427 describes an arrangement for dealing with this problem. The calibration zone is provided with strain gauges that measure the pressure with which the mat being calibrated resists compression. A controller compares these detected reaction pressures with desired values so that, for instance, when the reaction pressure drops to indicate the board is overly compressed, it reduces pressure upstream in the actuators bearing on the workpiece in the compression zone. Such a complicated arrangement operates adequately with slowly varying workpieces, but the feedback nature of its operation creates a response time too long to compensate out localized irregularities, and in fact can damage the workpiece in response to detection of such a localized problem.

In jointly filed and copending patent application Ser. No. 719,759, filed Apr. 4, 1985, spacers are provided for establishing the position in which the movable platen is held in the downstream zone. In addition the movable platen of this system has a compression portion that is at least limitedly vertically displaceable relative to the downstream calibration portion. The calibration portion is urged into a calibration position spaced a predetermined vertical distance from the other platen and the compression portion is urged with a predetermined generally constant force toward the other platen while permitting deflection of the compression portion of the one platen away from the other platen against this constant force and without substantial change of same.

OBJECTS OF THE INVENTION

It is therefore an object of the present invention to provide an improved belt-type particleboard press.

Another object is the provision of such a belt-type particleboard press which extends the principles and effectiveness of the above-described prior-art systems.

A further object is to provide such a press which produces rigid particleboard from a nonrigid mat whose size varies considerably.

SUMMARY OF THE INVENTION

A belt-type press for making particleboard according to the invention has a longitudinal row of transverse frames, upper and lower vertically spaced and longitudinally extending press beams extending along and carried on the row of frames, upper and lower vertically spaced and heated press platens carried on the beams, confronting each other, and forming a straight horizontal and longitudinal path, and respective upper and lower belts having confronting parallel stretches lying between the platens and flanking the path. The belts are driven to move a mat of particles to be pressed along the path in a transport direction. The upper beam is at least limitedly vertically movable in the frames and the lower beam is generally stationary therein. A plurality of substantially identical hydraulic actuators engaged between the upper beam and the frames are pressurized to compress the mat between the belts with a relatively high pressure in an upstream compression region of the press and with a relatively low pressure in a downstream compression region of the press. The upper platen and beam have a downstream portion in the downstream region and an upstream portion in the upstream region and the upstream portions according to this invention are elastically deflectable upward relative to the downstream portions. Upper and lower vertically engageable abutments operatively engaged between the upstream portions of the upper platen and beam and the frame limit downward displacement of the upstream portions relative to the frame. In addition at least one abutment operatively engageable between the downstream portions of the upper beam and platen limits downward displacement of same below a predetermined lower position. Thus the thickness of the finished workpiece as it exits the press is established by the abutment of the downstream portions.

The invention is based on the discovery that in the pressure/displacement press curve that has a steep front flank as the product is initially compressed, a first plateau in the compression region, then a falling flank to a second plateau in the calibration region, the actual position of this first plateau is not terribly critical. The system of this invention shifts it somewhat downstream but without any deleterious effect on the workpiece. Simply subjecting the workpiece in the compression region to a uniform compression along with the standard heating sufficiently plastifies the workpiece for subsequent compression to an accurately determined thickness in the calibration zone. In other words, it has been found unnecessary to reduce the workpiece to a predetermined size in the compression zone; it need only be subjected to a predetermined compression force for a predetermined time. The actual compression will follow naturally, and against low resistance, once the binder resin is plastified. No complicated control arrangement is required to operate the press, and during a normal pressing operation the upstream abutments do not engage one another.

It is within the scope of this invention to provide individual pressure sensors on the press frames connected to a common controller. The required adjustments are determined by the controller and executed. According to a feature of this invention it is also possible to use hydraulic rams distributed over the press in accordance with the desired pressure curve as actuators and to hydraulically pressurize them all with the same pressure. The pressing force is formed in the compression region by the reaction force of the elastically deformable upper beam and of the upper platen against the elastic deformation and the effect of the actuators in this compression region.

The upper beam has outer longitudinal edges and the abutments of the upstream portion include upper abutments carried thereon and lower abutments carried on the rams. In addition the abutments of the downstream portion are carried on the frame and operatively engageable with the outer upper beam edge.

At least some of the abutments are of variable height. For instance they can be of wedge construction with small servomotors for relatively sliding the wedges. In addition at least in the calibration region deformations of the frame, the upper beam, and the upper platen transverse to the path are compensated out by means of the actuators and/or by the abutments. Such provision of abutments between the edges ensures perfect uniformity of thickness all across the width of the workpiece emerging from the downstream end of the press.

With the system of this invention the inevitable variations in the starting workpiece can be rendered irrelevant to the finished product, without the use of complicated control equipment and without any lag in response. So long as the incoming variations do not lie outside a normal range, the finished workpieces will be perfect.

DESCRIPTION OF THE DRAWING

The above and other features and advantages will become more readily apparent from the following, reference being made to the accompanying drawing in which.

SPECIFIC DESCRIPTION

Figure 1:
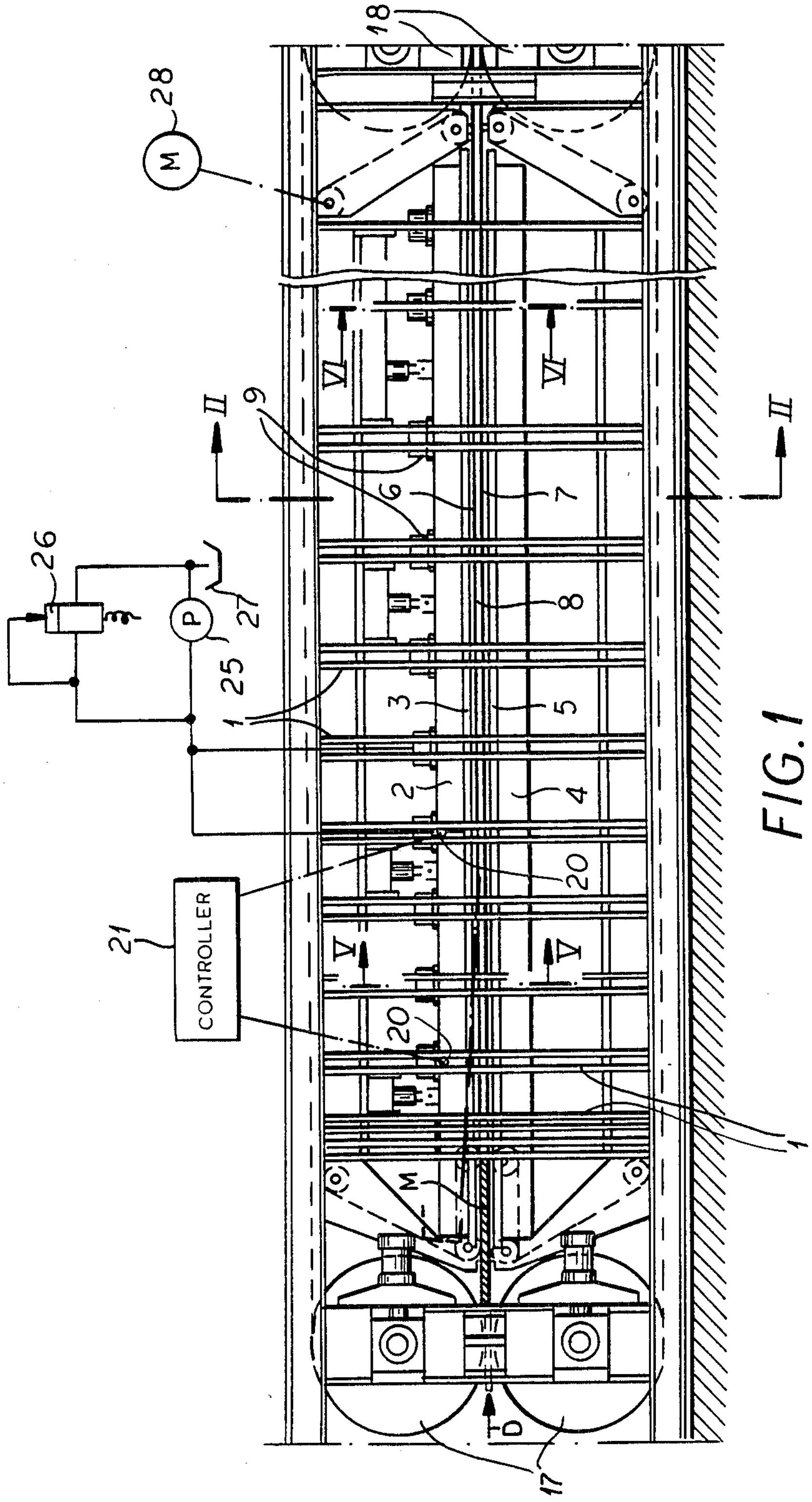
FIG. 1 is a side view of the press of this invention.
Figure 2:
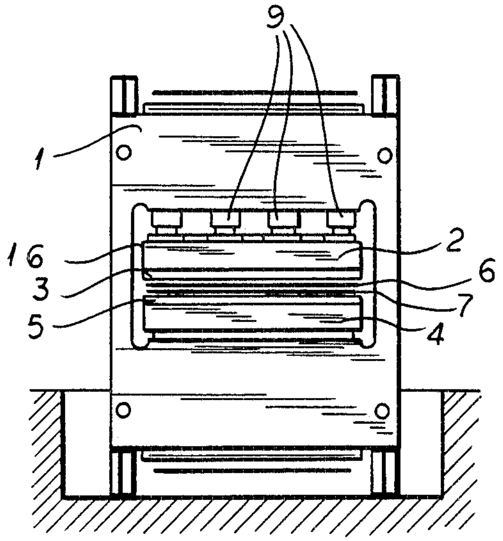
FIG. 2 is section taken along line II—II of FIG. 1.
Figures 3, 4:
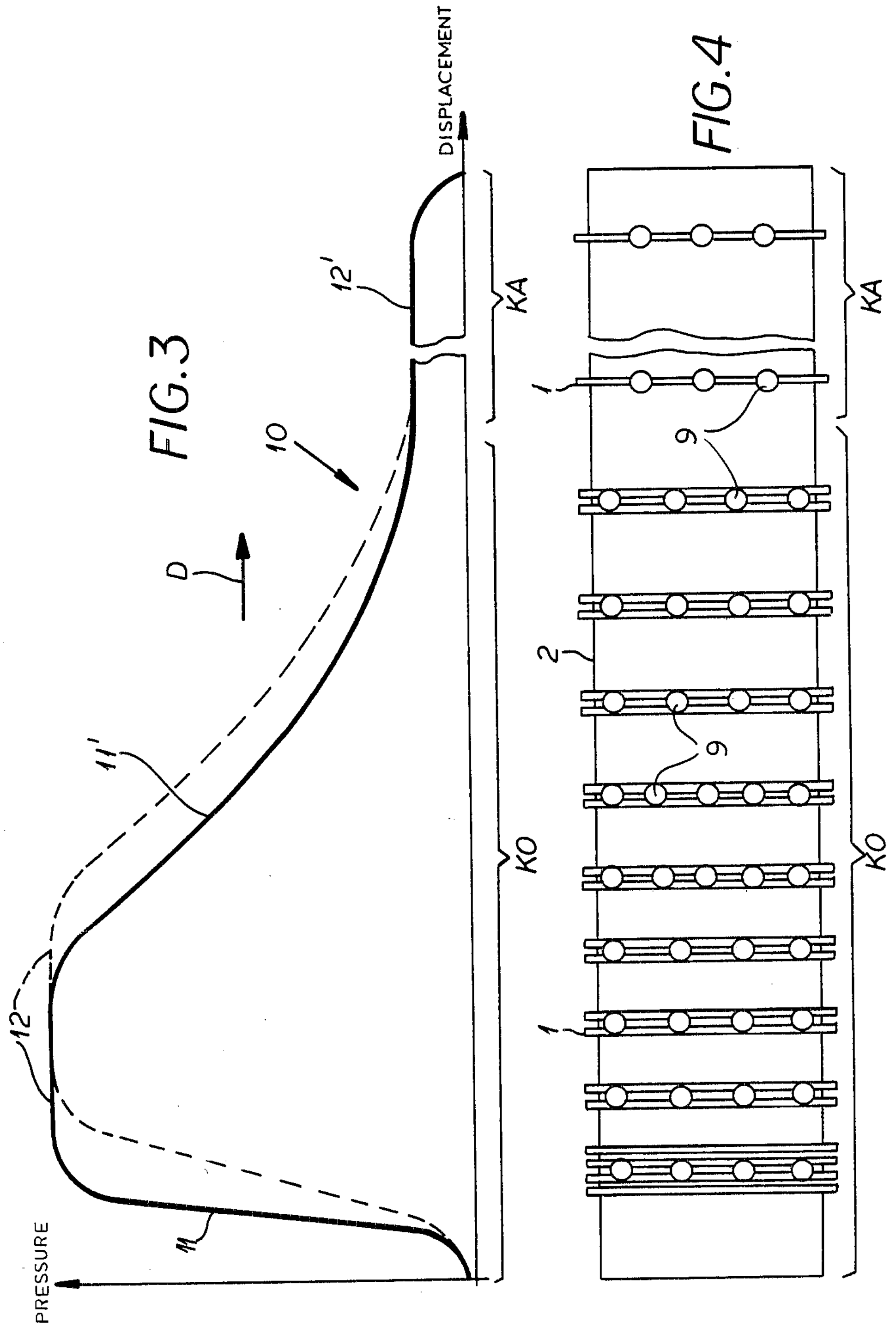
FIG. 3 is a diagram showing the press curve according to this invention.
FIG. 4 is a top view of the press of this invention.

As seen in FIGS. 1, 2, and 4, a press according to this invention receives a particle mat M in a direction D from a mat-forming and prepressing machine represented by rollers 17 and of the type described in U.S. Pat. Nos. 4,308,227, 4,315,722, 4,341,134, and 4,468,188. The press basically comprises a longitudinal row of transversely extending frames 1 in which are supported upper and lower press beams 2 and 4 in turn carrying upper and lower press platens 3 and 5. Upper and lower belts 6 and 7 flanked by these platens 3 and 5 define a pressing gap 8 in which the mat M is engaged. At its downstream end the press passes the pressed mat M to a finishing machine here represented by rollers 18. The lower beam 4 and plate 5 are rigid and stationary; the upper beam 2 and platen 3 are at least limitedly vertically displaceable and deformable as will be described below. The platens 3 and 5 are heated in the manner well known in the art to plastify the binder resin in the mat.

The upper platen 3 and beam 2 are urged downward by a multiplicity of individual hydraulic rams 9 braced between the frames 1 and the upper beam 2. As seen from FIGS. 3 and 4, these rams 9 are spaced both longitudinally (in direction D) and transversely more from each other in a downstream calibration zone KA than in an upstream compression zone KO. Rollers 19 (FIGS. 5 and 6) support the confronting stretches of the upper and lower belts 6 and 7 on the respective platens 3 and 5 so that the mat M can move through the press while it is being compressed, which displacement is effected by a motor shown schematically at 28.

Thus a press curve 10 as shown in FIG. 3 is produced which has rising and falling flanks 11 and 11', the former much steeper than the latter, a flat high-pressure region 12 and a flat low-pressure region 12' respectively lying in the compression and calibration zones KO and KA. The combination of the heat from the heated platens 3 and 5 and the compressive forces activate the binder resin in the mat M, creating a reaction force that is effective upward on the upper platen 3 and beam 2.

The spacing of the rams 9 establishes the shape of the curve 10 and all of these actuators 9 are pressurized at the same pressure from a pump 25 provided with a pressure-limiting valve 26 connected to a fluid supply 27, which represents a substantial simplification of the press. More details about this style of compression can be had from my above-cited U.S. Pat. No. 4,468,188.

It is also possible to control the arrangement by means of measurements made by strain gauges 20 connected to the controller 21.

Figure 7:
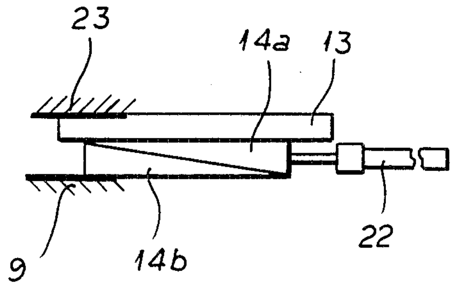
FIG. 7 is a side view of a detail of the press.
Figure 5:
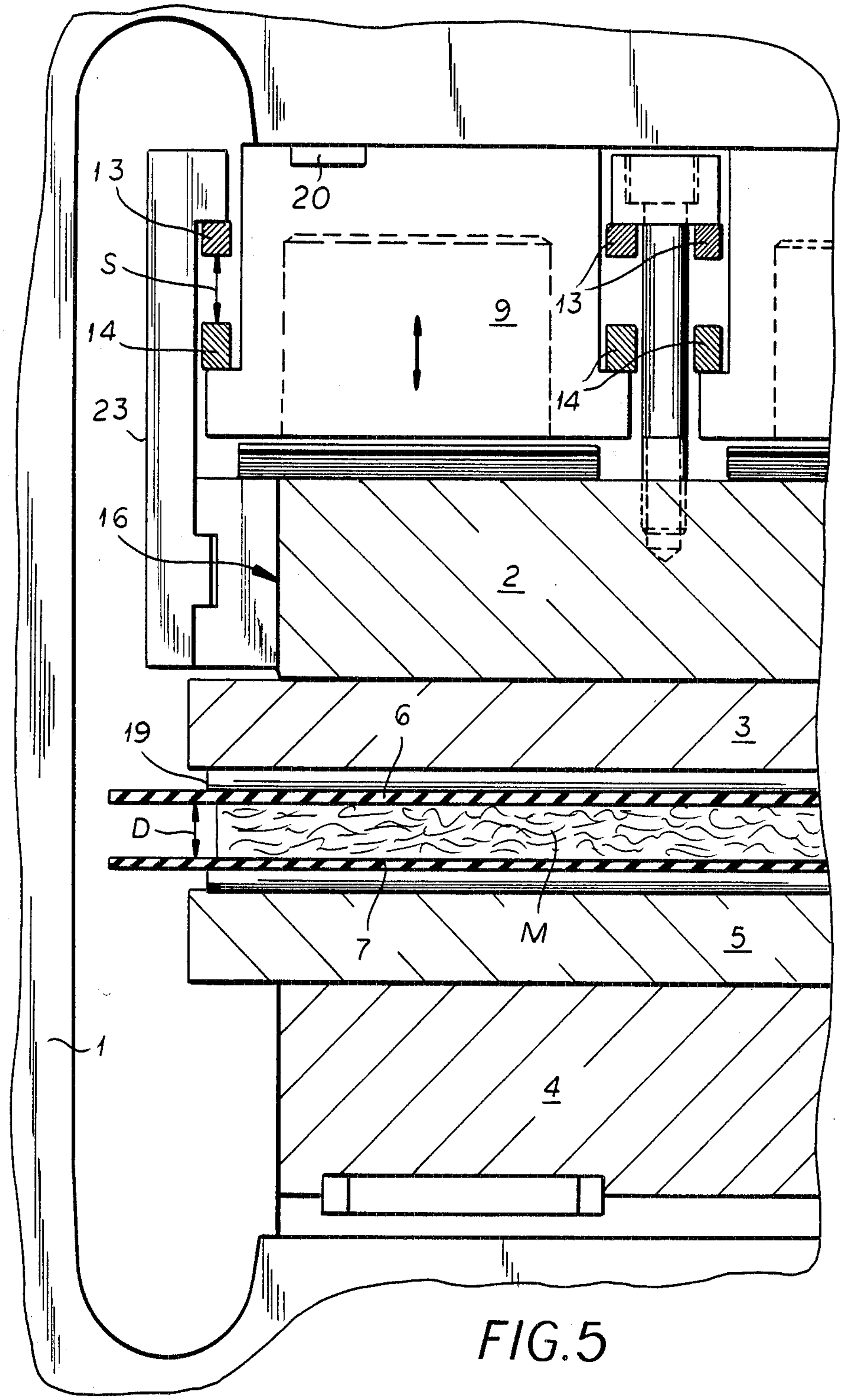
FIGS. 5 and 6 are sections taken respectively along lines V—V and VI—VI of FIG. 1.
Figure 6:
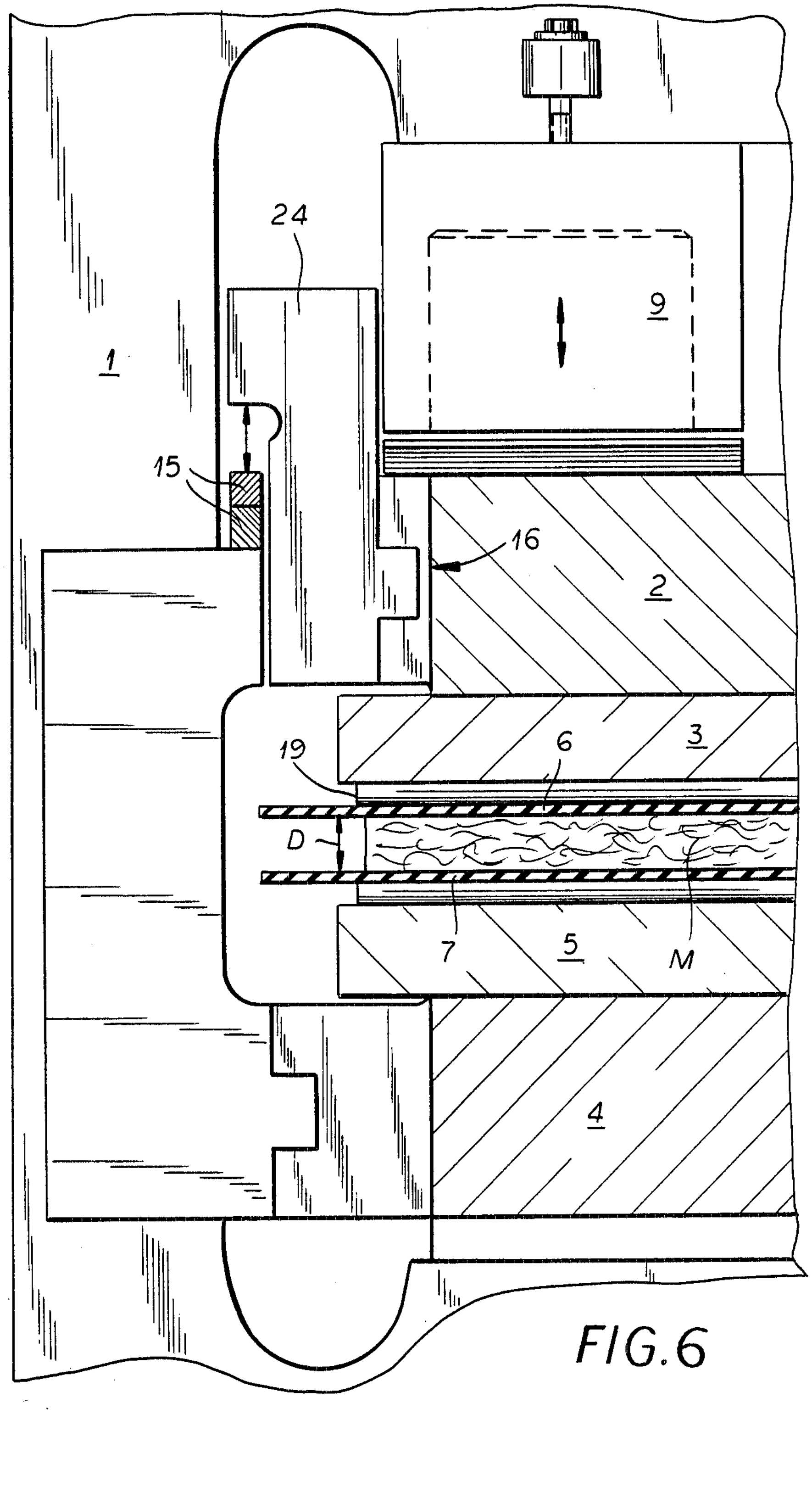

According to this invention the upper beam 2 is somewhat elastically deformable with the respective platen 3 as illustrated by the heavy dot-dash line at the upstream end of the press. This deformation is limited in the downward direction as shown in FIG. 5 by stops 13 carried on outrigger arms 23 mounted at the outer edges 16 of the beam 2 and engageable with adjustable stops 14 carried on the actuators 9 and defining a vertical displacement S for the upstream end of the beam 2. As seen in FIG. 7 the stop 14 can be formed of two wedges 14*a* and 14*b* that can be moved differentially to vary the height of this abutment 14. Further such abutments 13 and 14 can be provided inward of the edges 15 of the beam 2 as illustrated to the right in FIG. 5.

In use with the cylinders 9 unpressurized as shown in FIG. 5, the compression portion of the beam 2 is bent up by the reaction forces in the mat M. In normal use the two abutments 13 and 14 normally do not contact each other, as the reaction forces in the mat M exceed at least at the extreme upstream end of the press the downwardly effective pressure on the beam 2. As a result the region 12 of the curve as shown in FIG. 3 in dashed lines is shifted somewhat downstream, which has no deleterious effect on the finished product. The stops 13 and 14 put a lower limit to the displacement of this flexible portion, so that if a particularly thin portion of the workpiece enters the system it will not be compressed to a thickness smaller than that desired.

Similarly, the outer edge of the beam 2 is provided in the calibration zone with an outrigger 24 that can engage downward against wedge-type stops 15 which establish the thickness D of the finished mat. These stops 15 are useful because by the time the heated mat M has reached the calibration zone it has substantially lost its elasticity and could easily be compressed excessively.

I claim:

1. A method of operating a belt-type press for making particleboard, the press having;

a longitudinal row of transverse frames;

upper and lower vertically spaced and longitudinally extending press beams extending along and carried on the row of frames, the upper beam being at least limitedly vertically movable in the frames and the lower beam being generally stationary therein;

upper and lower vertically spaced and heatable press platens carried on the beams, confronting each other, and forming a straight horizontal and longitudinal path;

respective upper and lower belts having confronting parallel stretches lying between the platens and flanking the path; and a plurality of substantially identical and upright hydraulic rams engaged between the upper beam and the frames and closely spaced in an upstream compression region of the press and relatively widely spaced in a downstream calibration region of the press; the method comprising the steps of:

advancing the belts in a transport direction and thereby transporting a mat of particles and a thermally activatable binder through the press from the upstream region thereof to and through the downstream region thereof;

heating the platens and thereby activating and softening the binder of the mat;

hydraulically pressurizing the rams all with the same pressure and thereby compressing the mat between the belts with a high pressure in the upstream compression region of the press and with a low pressure in the downstream calibration region of the press, the upper platen and beam having a downstream portion in the downstream region and an upstream portion in the upstream region, the upstream portions being elastically deflectable upward relative to the downstream portions on hydraulic pressurization of the rams all with the same pressure;

limiting downward displacement of the upstream portions of the upper platen and beam relative to the frames; and limiting downward displacement of the downstream portions of the upper platen and beam relative to the frames by means of an abutment such that the thickness of the practiceboard as it exits the press is established by the abutment.

2. A belt-type press for making particleboard, the press comprising;

a longitudinal row of transverse frames;

upper and lower vertically spaced and longitudinally extending press beams extending along and carried on the row of frames, the upper beam being at least limitedly vertically movable in the frames and the lower beam being generally stationary therein;

upper and lower vertically spaced and heated press platens carried on the beams, confronting each other, and forming a straight horizontal and longitudinal path;

upper and lower belts having confronting parallel stretches lying between the platens and flanking the path, whereby the belts are driven to move a mat of particles to be pressed along the path in a transport direction;

a plurality of substantially identical and upright hydraulic rams engaged between the upper beam and the frames and closely spaced in an upstream compression region of the press and widely spaced in a downstream calibration region of the press;

at least one downstream abutment operatively engageable between the upper beam and platen in the downstream region;

means for hydraulically pressurizing the rams all with the same pressure and thereby compressing the mat between the belts with a high pressure in the upstream compression region of the press and with a low pressure in the downstream calibration region of the press and for operatively engaging the downstream abutment between the upper beam and platen for limiting downward displacement of same below a predetermined lower position only in the downstream region, whereby the thickness of the particleboard as it exits the press is established by the downstream abutment, the upper platen and beam having a downstream portion in the downstream region and an upstream portion in the upstream region, the upstream portions being elastically deflectable upward relative to the downstream portions; and upper and lower vertically engageable upstream abutments operatively engaged between the upstream portions of the upper platen and beam and the frames for limiting downward displacement of the upstream portions relative to the frames.

3. The particleboard press defined in claim 1 wherein the upper beam has outer longitudinal edges and the abutments of the upstream portion include upper abutments carried thereon and lower abutments carried on the rams.

4. The particleboard press defined in claim 1 wherein the upper beam has outer longitudinal edges and the abutments of the downstream portion are carried on the frame and operatively engageable with the outer upper beam edge.

5. The particleboard press defined in claim 1 wherein at least some of the abutments are of variable height.

6. The particleboard press defined in claim 1 wherein at least in the calibration region deformations of the frame, the upper beam, and the upper platen transverse to the path are compensated out by means of the actuators.

7. The particleboard press defined in claim 1 wherein at least in the calibration region deformations of the frame, the upper beam, and the upper platen transverse to the path are compensated out by means of the abutments.

* * * * *